United States Patent [19]

Parsons

[11] Patent Number: 4,545,842
[45] Date of Patent: Oct. 8, 1985

[54] METHOD FOR ADHESIVE BONDING OF ALUMINUM

[75] Inventor: Robert C. Parsons, Richmond, Va.

[73] Assignee: Reynolds Metals Company, Richmond, Va.

[21] Appl. No.: 635,158

[22] Filed: Jul. 27, 1984

[51] Int. Cl.$^4$ .............................. B32B 7/00; C09J 5/04
[52] U.S. Cl. .................... 156/310; 106/14.14; 106/287.24; 148/6.2; 148/6.27; 156/316; 156/629; 427/409; 428/461
[58] Field of Search ............ 156/316, 629, 310; 106/14.14, 287.24; 427/409; 428/461; 148/6.2, 6.27

[56] References Cited

U.S. PATENT DOCUMENTS

| | | | |
|---|---|---|---|
| 3,466,207 | 9/1969 | Vincent et al. | 156/629 |
| 3,567,521 | 3/1971 | Toy et al. | 148/6.3 |
| 3,582,427 | 6/1971 | Bacskai | 428/461 |
| 3,669,797 | 6/1972 | Fukazawa et al. | 156/316 |
| 3,812,003 | 5/1974 | Larson et al. | 161/156 |
| 4,187,258 | 2/1980 | Simon | 525/157 |
| 4,191,596 | 3/1980 | Dollman et al. | 148/6.27 |
| 4,250,274 | 2/1981 | Damico et al. | 525/127 |
| 4,370,387 | 1/1983 | Ueno et al. | 428/458 |
| 4,387,129 | 6/1983 | Vincent | 428/195 |

OTHER PUBLICATIONS

"A No-Rinse Conversion Coating to Minimize Water Pollution", Proceedings of the Fall Technical Meeting, The National Coil Coaters Association, Oct. 4-6, 1972, pp. 9-13.
"New and Different Paint Surface Treatments for Aluminum", Proceedings of the Fall Technical Meeting, The National Coil Coaters Association, Sep. 27-29, 1978, pp. 27-28.
"Non-Chrome Spray Treatment for Steel and Aluminum", Proceedings of the Annual Meeting, The National Coil Coaters Association, May 18-20, 1981, pp. 15-16.
"Pretreatment: A Good Start Helps a Good Finish", Proceedings of the Fall Technical Meeting, The National Coil Coaters Association, Sep. 30-Oct. 2, 1981, pp. 20-24.
"AL MX-81690 and AL MX-81691—Coating Chemicals", Amchem Products, Inc., Jun., 1982.

*Primary Examiner*—John J. Gallagher
*Attorney, Agent, or Firm*—Alan T. McDonald

[57] ABSTRACT

A method is disclosed for laminating plastics resin films to aluminum. The aluminum surface to be bonded is treated with a coating composition consisting essentially of an aqueous solution of polyacrylic acid or esters thereof and at least one acid selected from the group consisting of $H_2ZrF_6$, $H_2TiF_6$ and $H_2SiF_6$. After this coating has dried, the plastics resin film is bonded to the aluminum, using dry laminating adhesives.

4 Claims, No Drawings

METHOD FOR ADHESIVE BONDING OF ALUMINUM

BACKGROUND OF THE INVENTION

Laminates of aluminum, notably in the form of foil, and plastics resin films, such as polyethylenes, polyesters, polypropylenes and the like, are staple products of commerce. It is known, however, that aluminum does not present a completely satisfactory adhesive bonding surface for laminates for use in retort operations.

Problems which occur in adhesively bonded aluminum-plastics resin film laminates, especially with regard to aluminum foil laminates, is the formation of blisters or the delamination of the foil and film. This problem is likely to occur if the laminate is subjected to a retorting operation.

The retort procedure, as applied to a pouch formed from aluminum foil-plastics resin film laminates, comprises subjecting a filled pouch to a pressurized steam heating operation, with temperatures in the order of about 250° F. It is in this operation that blisters and/or delamination most often is initiated.

The dry laminating of plastics resin films to aluminum, and more particularly aluminum foil, may take place in the following manner. A thermosetting or thermoplastic adhesive is applied to either the aluminum surface or the surface of the plastics resin film to be bonded and the aluminum or the plastics resin film having the adhesive thereon is heated to dry the adhesive. The aluminum surface and the film surface are then contacted, with the now dry adhesive therebetween, and passed between a pair of pressure rollers, at least one of which is heated, to soften the adhesive and complete the bonding operation.

It is desirable, therefore, to provide a pretreatment material for the aluminum surface to be bonded which reduces the tendency for blisters or delamination to occur in laminates formed from aluminum and plastics resin films, especially laminates formed from aluminum foils.

THE PRESENT INVENTION

By means of the present invention, this objective has been obtained.

The method of the present invention comprises treating the aluminum surface to be adhesively bonded with a coating composition consisting essentially of an aqueous solution of (a) polyacrylic acid or esters thereof and (b) at least one acid selected from the group consisting of $H_2ZrF_6$, $H_2TiF_6$ and $H_2SiF_6$. The coating composition is dried and the plastics resin film is laminated to the treated surface of the aluminum by means of a dry thermosetting or thermoplastic adhesive. The laminate formed according to this process can withstand the retort operation while giving improved blister resistance and decreased delamination tendency to the resulting laminate.

DETAILED DESCRIPTION OF THE PREFERRED EMBODIMENTS

While directed especially to aluminum foil, it should be noted that the method of the present invention may be applied to aluminum in other forms, such as sheet, plate and the like.

According to the present invention, the surface of the aluminum to be adhesively bonded is pretreated with a coating composition to increase its susceptibility to adhesive bonding. This wet coating material is dried, as by passing the aluminum through an oven operating at a temperature which may range between about 200° and 300° F.

Either the surface of plastics resin film to be bonded or the pre-treated aluminum surface is then coated with the thermosetting or thermoplastic adhesive material, which may be, for example, adhesives of the types such as one part polyurethanes, two part polyurethanes, polyethers, polyesters, two component epoxy-modified polyesters or polyurethanes, acrylics and acrylic copolymers, vinylidene chloride copolymers, and expoxies. This adhesive is applied wet and the film or foil to which this adhesive is applied is passed through an oven operating at a temperature ranging from between about 250° to about 300° F. to dry the adhesive.

The pre-treated aluminum surface and the plastics resin film are brought into contact, with the now dry adhesive therebetween, and heat and pressure bonded, such as by passing the composite structure between a pair of pressure rollers heated to a temperature ranging between about 240° F. and 400° F. The heat and pressure softens the adhesive, provides intimate contact between the film and foil, and completes the bonding operation.

The method of present invention resides in the use of a specific pre-treatment material for the aluminum surface to be bonded. The pre-treatment composition consists essentially of an aqueous solution of (a) polyacrylic acid or esters thereof and (b) at least one acid selected from the group consisting of $H_2ZrF_6$, $H_2TiF_6$ and $H_2SiF_6$. These materials are known per se and their preparation is described in U.S. Pat. No. 4,191,596, the disclosure of which is incorporated herein by reference. These materials are sold by Amchem Products, Inc. as two component systems under their designations Alodine 1690 and 1691.

These materials are described in U.S. Pat. No. 4,191,596 as improving adhesion of paint to aluminum. The adhesion mechanism of dry, adhesive bonding and lamination and the adhesion mechanism of a wet applied material, such as paint, are different. It is thus surprising, therefore, that this pre-treatment material, which was known only for its paint adhesion properties, would supply the excellent dry laminating properties needed for aluminum-plastics resin film lamination, and the ability to withstand the retort processing of laminated pouches.

The pre-treatment composition is applied as an aqueous solution having from about 0.5 to about 10 grams per liter of polyacrylic acid or esters thereof, such as the methyl, ethyl and butyl esters of polyacrylic acid, and from about 0.2 to about 8 grams per liter of at least one acid selected from the group consisting of $H_2ZrF_6$, $H_2TiF_6$ and $H_2SiF_6$. The solution should have a pH less than about 3.5, and preferably less than about 2.5. The preparation of the aqueous solution, as well as the preparation of concentrates for replenishing the solution, is fully described in incorporated by reference U.S. Pat. No. 4,191,596, and need not be repeated here.

EXAMPLE

An aluminum foil having a thickness of 0.0007 inches was treated with an aqueous pre-treatment according to the present invention formed from 1.7% by weight Alodine 1691, 2.0% by weight Alodine 1690 and 96.3% by weight deionized water. This pre-treatment was gravure roller coated onto the aluminum foil in an amount of less than 0.1 pound per ream and the aluminum foil was passed through an oven operating at a temperature of 300° F. to dry the pre-treatment coating. The aluminum foil was then gravure roller coated with a polyurethane adhesive in an amount of 2.0 pounds per ream and passed through an oven operating at a temperature of 325° F. to dry the adhesive. The adhesively coated surface of the aluminum foil was then contacted with a polyester film having a thickness of 0.00048 inches and the composite passed between a pair of rollers heated to a temperature of 250° F. and operating at a pressure of 40 pounds per square inch guage. A polypropylene film was sealed to the other side of the aluminum foil by pressure sealing.

Pouches were formed from this material by heat sealing edges of the polypropylene side of laminates formed in the above manner to one another, the pouches were filled with water, heat sealed and subjected to retorting at a temperature of 250° F. and a pressure of 25 pounds per square inch guage for a time period of 1 hour.

Upon inspection of the pouches, after retorting, the pouches were free from blisters and no delamination of the film and foil was noted.

From the foregoing, it is clear that the present invention provides a method for adhesively bonding aluminum to plastics resin films which results in improved bond stability.

While the invention has been described with reference to certain specific embodiments thereof, it is not intended to be so limited thereby, except as set forth in the accompanying claims.

I claim:

1. In a method for bonding a plastics resin film to aluminum comprising applying an adhesive to said film or said aluminum, drying said adhesive, contacting said film and said aluminum with said adhesive therebetween to form a laminate and subjecting said laminate to heat and pressure to bond said laminate the improvement comprising treating the surface of said aluminum to be bonded with a composition consisting essentially of an aqueous solution having from about 0.5 to about 10 grams per liter of polyacrylic acid or esters thereof and from about 0.2 to about 8 grams per liter of at least one acid selected from the group consisting of $H_2ZrF_6$, $H_2TiF_6$ and $Hp_2SiF_6$ and drying said composition on said aluminum prior to contacting said film and said aluminum with said adhesive therebetween.

2. The method of claim 1 wherein said polyacrylic acid esters comprise methy, ethyl and butyl esters.

3. The method of claim 1 wherein said plastics resin film comprises polyesters, polyethylenes and polypropylenes.

4. The method of claim 1 wherein said adhesive comprises one part polyurethanes, two part polyurethanes, polyethers, polyesters, two component epoxy-modified polyesters or polyurethanes, acrylics and acrylic copolymers, vinylidene chloride copolymers, and epoxies.

* * * * *